Figure 1:
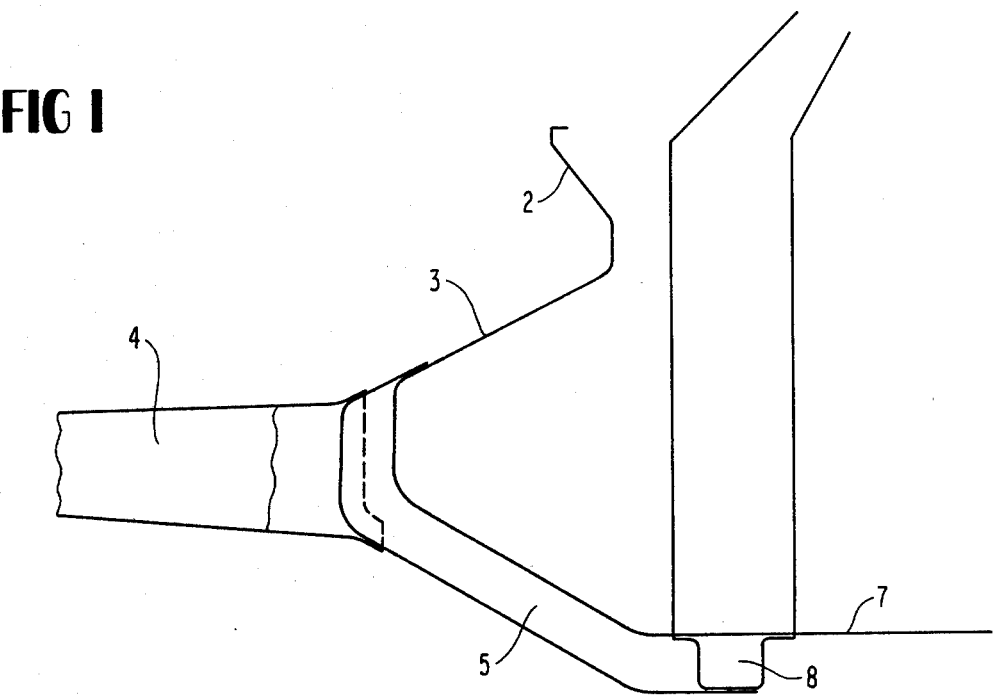

United States Patent [19]

Bauer et al.

[11] 4,188,059
[45] Feb. 12, 1980

[54] FORWARD LONGITUDINAL BEARER SUPPORTED AT THE VEHICLE END WALL OF A SELF-SUPPORTING MOTOR VEHICLE BODY

[75] Inventors: Wilhelm Bauer; Kurt Heinrich, both of Sindelfingen; Wolfgang Klie, Korntal; Wolfgang Rau, Renningen; Werner Trost, Raidwangen, all of Fed. Rep. of Germany

[73] Assignee: Daimler-Benz Aktiengesellschaft, Fed. Rep. of Germany

[21] Appl. No.: 911,929

[22] Filed: Jun. 2, 1978

[30] Foreign Application Priority Data

Jun. 3, 1977 [DE] Fed. Rep. of Germany ....... 2725085

[51] Int. Cl.² .............................................. B62D 21/00
[52] U.S. Cl. ..................................... 296/188; 280/781
[58] Field of Search ............... 296/28 R, 28 E, 28 F, 296/28 J, 28 K; 280/781, 785; 180/89.1, 90

[56] References Cited

U.S. PATENT DOCUMENTS

| 2,047,336 | 7/1936 | Stout | 296/28 J |
| 2,797,954 | 7/1957 | Uhlenhaut | 296/28 J |
| 3,827,525 | 8/1974 | Felzer | 296/28 R |
| 3,971,588 | 7/1976 | Bauer | 296/28 R |

Primary Examiner—Philip Goodman
Attorney, Agent, or Firm—Craig and Antonelli

[57] ABSTRACT

A longitudinal bearer support for a forward longitudinal bearer supported under angular bending at the end wall of a self-supporting motor vehicle body, whereby the end wall is locally bulged out in the direction of the vehicle end within the connecting area of each forward longitudinal bearer in such a manner that a form-rigid body results; each forward longitudinal bearer is forked in its approach at the form-rigid body and the resulting arms at least partially surround the form-rigid body; two arms are created by the forking which, extending either parallelly to one another or at an angle to one another, lead to the subfloor.

11 Claims, 2 Drawing Figures

FORWARD LONGITUDINAL BEARER SUPPORTED AT THE VEHICLE END WALL OF A SELF-SUPPORTING MOTOR VEHICLE BODY

The present invention relates to a forward longitudinal bearer supported under angular bending at an end wall or dashboard of a selfsupporting motor vehicle body, whereby within the connecting area of each forward longitudinal bearer the end wall is locally bulged out in the direction toward the vehicle end in such a manner that a form-rigid body results, and whereby each forward longitudinal bearer receives in its approach at the form-rigid body a forking and the arms resulting thereby at least partially surround the form-rigid body, as disclosed in the German Application P 27 25 083.5 (corresponding to commonly assigned U.S. application Ser. No. 911,923, filed June 2, 1979).

Such a reinforced end wall area entails the advantage that high forces can be introduced over a large area by way of the arms without leading prematurely to deformation appearances within the area of the end wall and of the pedal floor.

It is the aim of the present invention to indicate in consequential furtherance of this concept the possibility for a solution which is able to safely absorb the occurring forces with low costs and insignificant weight increase.

Consequently, a longitudinal bearer support of the aforementioned type is proposed, whereby according to the present invention two arms are created by the bifurcation or forking, which extending either parallelly or at an angle to one another, lead to the subfloor.

For purposes of further reinforcement, the ends of the arms can be interconnected by at least one bearer mounted on the subfloor or formed out of the same and extending in the vehicle transverse direction.

In one preferred embodiment of the present invention, the arms are formed by indentations or embossments in the form-rigid body and are closed off by a sheet-metal cover member.

However, it is also possible that the arms together with the bearer connecting the free ends thereof form a preassembled installable bearer connection, to which is connected the associated longitudinal bearer.

Accordingly, it is an object of the present invention to provide a longitudinal bearer support for a forward longitudinal bearer supported under angular bending at the end wall of a self-supporting motor vehicle body which avoids by simple means the aforementioned shortcomings and drawbacks encountered in the prior art.

Another object of the present invention resides in a longitudinal bearer support of the type described above which offers low manufacturing and assembly costs and insignificant weight increases, yet is capable of safely absorbing all occurring forces.

A further object of the present invention resides in a longitudinal bearer support of the type described above in which the forward longitudinal bearer is effectively reinforced by extremely simple means.

Still another object of the present invention resides in a forward longitudinal bearer supported under angular bending at the end wall of a self-supporting motor vehicle body, which is simple in construction, extremely rigid in its mechanical properties and capable to assure a high degree of safety to the passengers in case of even serious front-end collisions.

Figure 2:
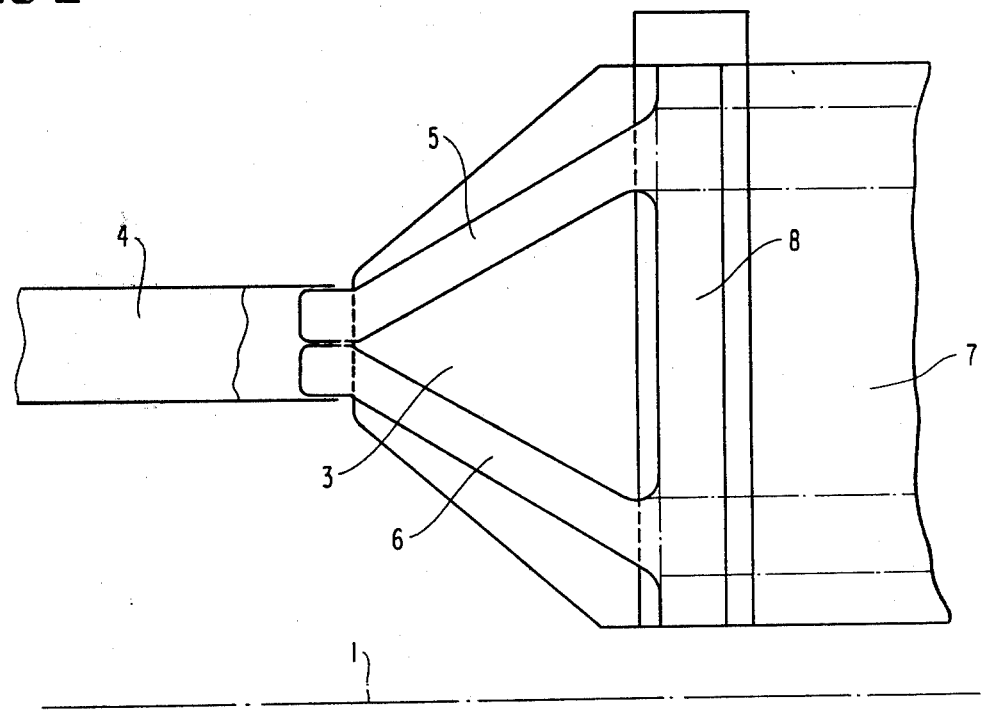

These and other objects, features and advantages of the present invention will become more apparent from the following description when taken in connection with the accompanying drawing which shows, for purposes of illustration only, one embodiment in accordance with the present invention, and wherein:

FIG. 1 is a partial somewhat schematic side elevational view of the connecting area of a forward longitudinal bearer according to the present invention; and FIG. 2 is a partial bottom plan view of the longitudinal bearer connecting area of FIG. 1.

Referring now to the drawing wherein like reference numerals are used throughout the two views to designate like parts, a form-rigid body 3 which is created on both sides of the center longitudinal axis 1 (FIG. 2) of a self-supporting motor vehicle body (not shown) by a local bulging-out of the end wall or dash 2, receives a forward longitudinal bearer 4 under angular bending which in front of its approach or abutment at the form-rigid body 3 is subdivided into two arms 5 and 6. These two arms 5 and 6 extend at an angle to one another and adjoin the subfloor 7, i.e., are connected thereto and may be formed, for example, out of the walls of the form-rigid body 3 and covered-off by a sheet-metal cover member.

At least one bearer 8 connecting the free ends of the arms 5 and 6 and extending in the vehicle transverse direction provides an additional reinforcing effect so that—as indicated by tests—the sheet-metal thickness of the thus-resulting bearer connection can be less than the thickness of the longitudinal bearer 4.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A motor vehicle body including a longitudinal bearer and comprising end wall means defining a wall of a passenger compartment and locally bulged out in the direction of the respective vehicle end in a manner forming a rigid body, said longitudinal bearer having an end supported against said end wall and being forked so as to create a pair of arms partially surrounding said rigid body and extending to a subfloor forming means.

2. A motor vehicle body according to claim 1, wherein one said longitudinal bearer and rigid body are formed on each side of a center vehicle longitudinal axis.

3. A vehicle body according to claim 1, characterized in that said arms extend to the subfloor means substantially parallel to one another.

4. A longitudinal bearer support according to claim 1, characterized in that said arms extend to the subfloor means at an angle to one another.

5. A vehicle body according to claim 1 or 2, or 3, characterized in that the ends of the arms are connected by at least one bearer means extending in the vehicle transverse direction.

6. A longitudinal bearer support according to claim 5, characterized in that said transversely extending bearer means is mounted on the subfloor means.

7. A longitudinal bearer support according to claim 5, characterized in that said transversely extending bearer means is formed out of the subfloor means.

8. A vehicle body according to claim 5, characterized in that the arms are formed by indentations or embossments in the rigid body means and are closed off by a cover means.

9. A vehicle body according to claim 8, characterized in that a second forked longitudinal bearer is provided, each longitudinal bearer being associated with a respective rigid body means, and in that the arms, together with the transversely extending bearer means connecting the free ends thereof, form a preassembled bearer connection to which an associated longitudinal bearer is connected.

10. A longitudinal bearer support according to claim 1, 2 or 3, characterized in that the arms are formed by indentations or embossments in the rigid body means and are closed off by a cover means.

11. A motor vehicle body according to claim 5, characterized in that a second forked longitudinal bearer is provided, each longitudinal bearer being associated with a respective rigid body means, and in that the arms, together with the transversely extending bearer means connecting the free ends thereof form a preassembled bearer connection to which the associated longitudinal bearer means is connected.

* * * * *